United States Patent
Wen et al.

(10) Patent No.: US 7,480,652 B2
(45) Date of Patent: Jan. 20, 2009

(54) DETERMINING RELEVANCE OF A DOCUMENT TO A QUERY BASED ON SPANS OF QUERY TERMS

(75) Inventors: Ji-Rong Wen, Beijing (CN); Ruihua Song, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 11/259,621

(22) Filed: Oct. 26, 2005

(65) Prior Publication Data

US 2007/0094234 A1    Apr. 26, 2007

(51) Int. Cl.
*G06F 17/30* (2006.01)
*G06F 15/16* (2006.01)

(52) U.S. Cl. ............... 707/5; 707/1; 707/2; 707/3; 707/4

(58) Field of Classification Search .......... 707/2, 707/3, 4, 5; 715/513
See application file for complete search history.

(56) References Cited

U.S. PATENT DOCUMENTS

| | | | | |
|---|---|---|---|---|
| 5,826,261 | A * | 10/1998 | Spencer | 707/5 |
| 6,581,057 | B1 * | 6/2003 | Witbrock et al. | 707/5 |
| 6,778,981 | B2 * | 8/2004 | Lee et al. | 707/3 |
| 6,823,333 | B2 * | 11/2004 | McGreevy | 707/4 |
| 6,947,930 | B2 * | 9/2005 | Anick et al. | 707/5 |
| 2005/0022114 | A1 * | 1/2005 | Shanahan et al. | 715/513 |
| 2007/0005563 | A1 * | 1/2007 | Aravamudan et al. | 707/2 |

OTHER PUBLICATIONS

Brin, Sergey and Lawrence Page, "The Anatomy of a Large-Scale Hypertextual Web Search Engine," Computer Networks and ISDN Systems, vol. 30, 1998, 25 pages.
Clarke, Charles L. A. et al., "Shortest Substring Ranking (MultiText Experiments for TREC-4)," 1995, pp. 1-10.
Clarke, Charles L.A. et al., "Relevance ranking for one to three term queries," Information Processing and Management, 36 (2000), © 2000 Elsevier Science Ltd., pp. 291-311.
Fox, Christopher, "A Stop List for General Text," SIGIR Forum, ACM Press, vol. 24, No. 4, Dec. 1990, pp. 19-35.

(Continued)

*Primary Examiner*—Tony Mahmoudi
*Assistant Examiner*—Yu Zhao
(74) *Attorney, Agent, or Firm*—Perkins Coie LLP

(57) ABSTRACT

A relevance system determines the relevance of a query term to a document based on spans within the document that contain the query term. The relevance system aggregates the relevance of the query terms into an overall relevance for the document. For each query term, the relevance system calculates a span relevance for each span that contains that query term. The relevance system then aggregates the span relevances for a query term into a query term relevance for that document. The relevance system may aggregate the query term relevances into a document relevance.

13 Claims, 7 Drawing Sheets

OTHER PUBLICATIONS

Hawking, David and Paul Thistlewaite, "Proximity Operators—So Near And Yet So Far," In Proceedings of TREC-4, 1995, pp. 131-143.

Hawking, David and Paul Thistlewaite, "Relevance Weighting Using Distance Between Term Occurrences," Computer Science Technical Report TR-CS-96-08, The Australian National University, Aug. 1996, 20 pages.

Luhn, H.P., "The Automatic Creation of Literature Abstracts," IBM Journal, Apr. 1958, 2, pp. 159-165.

Papineni, Kishore, "Why Inverse Document Frequency?," In Proceedings of the NAACL 2001, pp. 25-32.

Papka, Ron and James Allan, "Document Classification using Multiword Features," Conference on Information and Knowledge Management, Nov. 1998, ACM Press, pp. 124-131.

Porter, M.F.,"An Algorithm for suffix stripping," Program, vol. 14, No. 3, Jul. 1980, pp. 130-137.

Rasolofo, Yves and Jacques Savoy, "Term Proximity Scoring for Keyword-Based Retrieval Systems," Advances in Information Retrieval: 25th European Conference on IR Research, ECIR, 2003, Italy, © Springer-Verlag Berlin Heidelberg 2003, pp. 207-218.

Robertson, S.E. and K. Spark Jones, "Relevance Weighting of Search Terms," Journal of the American Society for Information Science, vol. 27, No. 3, May-Jun. 1976, pp. 129-146.

Robertson, S.E. et al., "Experimentation as a way of life: Okapi at TREC," Information Processing and Management, vol. 36, 2000, © 1999 Elsevier Science Ltd., pp. 95-108.

Rose, Daniel E. and Curt Stevens, "V-Twin: A Lightweight Engine for Interactive Use," In Proceedings of TREC-5, 1996, pp. 279-290.

Spink, Amanda et al., "Searching the Web: The Public and Their Queries," Journal of the American Society for Information Science and Technology, 52(3), Feb. 1, 2001, © 2001 John Wiley & Sons, Inc., pp. 226-234.

Wilkinson, Ross, Justin Zobel and Ron Sacks-Davis, "Similarity Measures for Short Queries," Oct. 1995, In Proceedings of TREC-4, 1995, pp. 277-285.

* cited by examiner

DETERMINING RELEVANCE OF A DOCUMENT TO A QUERY BASED ON SPANS OF QUERY TERMS

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms (i.e., query terms), the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity, and so on. The search engine service then displays to the user links to those web pages in an order that is based on a ranking determined by their relevance.

Search engines can more generally be used to search a corpus of documents with a web page being one type of document in the corpus. The other types of documents may include articles published in journals, dissertations, technical reports, patents, and so on. With such a corpus, it may be desirable to present the documents ranked based on their relevance to the query. One common technique for ranking the relevance of a document to a query is based on term frequency and inverse document frequency. Term frequency refers to the number of occurrences of a query term within a document, and inverse document frequency refers to the inverse of the number of documents that contain that query term. Generally, a document with a more occurrences of a query term tends to be more relevant, and a query term that occurs in fewer documents is a more important term. One approach for combining term frequency and inverse document frequency into a relevance score for a document is given by the following equation:

$$\sum_{t \in Q} w^{(1)} \frac{(k_1 + 1) \cdot tf}{K + tf} \quad (1)$$

where t is a query term of query Q, tf is term frequency of t within the document, $k_1$, is a constant, and K and $w^{(1)}$ are defined by the following equations. K is represented by the following equation:

$$K = k_1 \cdot \left[ (1-b) + b \cdot \frac{l}{avdl} \right] \quad (2)$$

where l is the document length, avdl is the average document length in the corpus, and b is a constant, $w^{(1)}$ is a Robertson/Sparck Jones weight represented by the following equation:

$$\log \frac{N - n + 0.5}{n + 0.5} \quad (3)$$

where N is the number of documents within the corpus and n is the number of documents containing the query term t within the corpus. Equation 3 is based on inverse document frequency. Thus, the score of relevance given by Equation 1 is based on term frequency, inverse document frequency, and document length.

The relevance of Equation 1 considers each query term independently. It is well known that the proximity of one query term to another query term affects relevance. For example, if the query is "home buying," then a document that contains the phrase "home buying" may be more relevant than a document that contains the words "home" and "buying" separated by 100 words. One approach for factoring in the proximity of query terms into relevance uses relevance derived from "adjacent" pairs of query terms. Query terms are considered adjacent when the only intervening terms are non-query terms. For example, if the document contains the phrase "at the home page, you can select the buying option for tips" and the query is "home buying tips," then "home" and "buying" are adjacent query terms that are separated by five non-query terms, a distance of five. However, "home" and "tips" are not adjacent, because the query term "buying" is between them. The relevance of adjacent pairs of query terms is represented by the following equation:

$$\sum_{(t_i, t_j) \in S} \min(w_i^{(1)}, w_j^{(1)}) \cdot \frac{(k_1 + 1) \cdot \sum_{occ(t_i, t_j)} tpi(t_i, t_j)}{K + \sum_{occ(t_i, t_j)} tpi(t_i, t_j)} \quad (4)$$

where $t_i$ and $t_j$ represent a pair of adjacent query terms and tpi is represented by the following equation:

$$tpi(t_i, t_j) = \frac{1.0}{d(t_i, t_j)^2} \quad (5)$$

where $d(t_i, t_j)$ is the distance between the query terms $t_i$ and $t_j$. The relevance of a document based on query term pairs (i.e., bigrams) is then combined with the relevance based on single query terms (i.e., unigrams) to give the overall relevance of a document.

A disadvantage with combining the unigram relevance and bigram relevance into document relevance is that it is difficult to estimate what their relative contributions should be. Moreover, a linear combination of these relevance scores may be inconsistent with the non-linear nature of traditional term frequency and inverse document frequency metrics.

SUMMARY

A relevance system determines the relevance of a query term to a document based on spans within the document that contain the query term. The relevance system aggregates the relevance of the query terms into an overall relevance for the document. The relevance system initially identifies spans of query terms within a document. A span of query terms is a sequence of terms of the document that includes one or more query terms that satisfy a proximity-based span definition. For each query term, the relevance system calculates a span relevance for each span that contains that query term. The relevance system then aggregates the span relevances for a query term into a query term relevance for that document. The relevance system may aggregate the query term relevances into a document relevance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
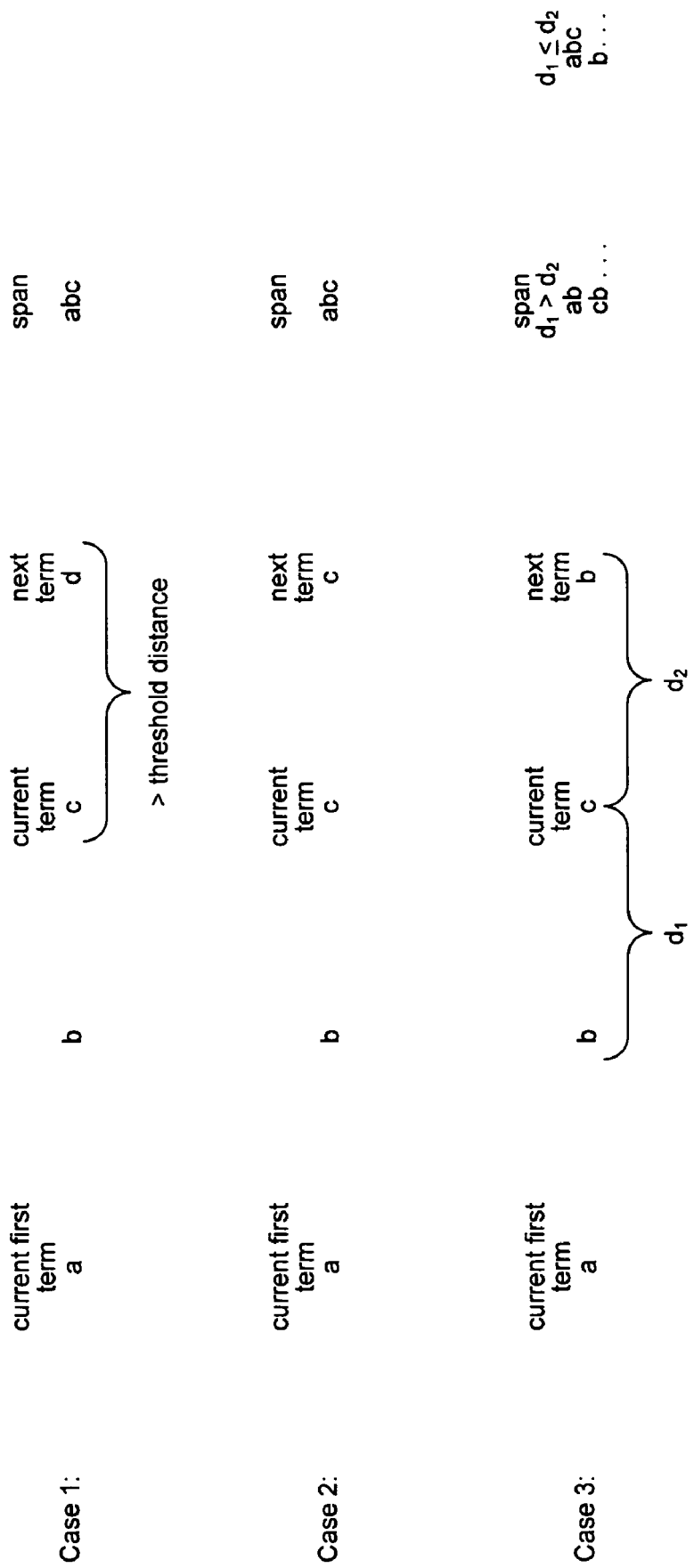
FIG. 1 is a diagram that illustrates the identifying of spans by the relevance system in one embodiment.

A method and system for determining relevance of a document to a query is provided. In one embodiment, the relevance system determines the relevance of a query term to a document based on spans within the document that contain the query term. The relevance system aggregates the relevance of the query terms into an overall relevance for the document. The relevance system initially identifies spans of query terms within a document. A span of query terms is a sequence of terms of the document that includes one or more query terms that satisfy a proximity-based span definition. For each query term, the relevance system calculates a span relevance for each span that contains that query term. The relevance system then aggregates the span relevances for a query term into a query term relevance for that document. For example, if the document contains the phrase "at the home page, you can select the buying option for tips" and the query is "home buying tips," then a span for each query term may be "home page you can select the buying option for tips." Alternatively, a span for "home" may be "home," and a span for "buying" and "tips" may be "buying option for tips." The span relevance for a query term may be based on the number of query terms in the span and an inverse of the span width. The span width is the number of terms between the first and last query term of the span. For example, the span width of the span "home page you can select the buying option for tips" is ten and of the span "buying option for tips" is four. Thus, the span relevance of a query term is higher when the span contains a greater number of query terms and is lower when the span width is greater. The relevance system may combine the span relevances into a query term relevance for each query term and then aggregates the query term relevances into a document relevance. Thus, the document relevance is based on the span relevance and is not based on term frequency. More generally, the query term relevance, also referred to as relevance contribution, can in general be used as a replacement for term frequency and can in particular be used in various metrics for calculating document relevance. In this way, the relevance system avoids the linear combination of unigram and bigram metrics and factors the query term proximity into the relevance of a document.

In one embodiment, the relevance system defines a span of query terms as a sequence of terms that includes no repeated occurrences of a query term and the distance between adjacent query terms within the sequence is less than a threshold distance. The relevance system may scan a document to identify sequences of terms that start and end with query terms. When the next query term in the document is the same query term as the last query term in the sequence currently identified, the relevance system terminates the sequence and indicates that the sequence is a span. The relevance system then continues scanning the document with the next query term as the start query term of the new sequence. The relevance system similarly terminates a sequence when the next query term is more than the threshold distance from the last query term of the current sequence. The relevance system also terminates a sequence when the next query term is a repeat of a query term in the sequence (other than the last query term which is terminated as described above). When the relevance system identifies that the next query term is a repeat of a query term already in the sequence, the relevance system may shorten the current sequence and terminate it after the first occurrence of the repeated query term or simply terminate the sequence after the last query term in the sequence. The relevance system shortens the current sequence after the first occurrence of the repeated query term when the distance from that occurrence to the next query term is greater than the distance from the last query term of the sequence to the next query term, which is the repeated query term. Otherwise, the relevance system does not shorten the sequence, but terminates it after the current last query term. In either case, the relevance system starts the next sequence at the next query term after the terminated sequence. For example, if the phrase is "at the home page, you can select the buying option for home tips" and the query is "home buying tips," the relevance system may identify the spans of "home" and "buying option for home tips." The relevance system initially considers the sequence "home page you can select the buying option for" when it encounters the second occurrence of "home" as the next query term. Since the second occurrence of "home" is closer to "buying" than the first occurrence of "home," the relevance system shortens and terminates the sequence after the first occurrence of "home." The relevance system then starts the next sequence at "buying," which is the first query term after the shortened sequence.

In one embodiment, the relevance system calculates the relevance of a document to a query by using relevance contribution of query terms based on spans rather than term frequency of query terms. The relevance system first identifies spans of the query terms within the document. The relevance system then calculates the relevance contribution of each query term based on the identified spans that contain that query term. The relevance system then determines the relevance of the document to the query based on the calculated relevance contributions without using a term frequency. For example, the relevance system may use relevance contribution in place of term frequency in a conventional metric (e.g., TF*IDF) for measuring the relevance of a document based on term frequency.

In one embodiment, the relevance system calculates the span relevance of a query term based on the number of query terms within the span and an inverse of the span width. The span relevance may be represented by the following equation:

$$f(t, espan_i) = \frac{n_i^y}{\text{Width}(espan_i)^x} \quad (6)$$

Where t is a query term, $espan_i$ is a span that contains t, $n_i$ is the number of query terms that occur in $espan_i$, Width($espan_i$) is the span width of $espan_i$, x is an exponent that is used to control the influence of the span width, and y is an exponent that is used to control the influence of the number of query terms in the span. When a span contains only one query term, its span width may be set to the threshold distance. The aggregation of span relevance into a query term relevance or relevance contribution is represented by the following equation:

$$rc = \sum_i f(t, espan_i) \quad (7)$$

The value relevance contribution rc can be substituted for term frequency in a conventional relevance metric. For example, the substitution of relevance contribution for term frequency in Equation 1 results in the following equation:

$$\sum_{t \in Q} w^{(1)} \frac{(k_1 + 1) \cdot rc}{K + rc} \quad (8)$$

FIG. 1 is a diagram that illustrates the identifying of spans by the relevance system in one embodiment. Case 1 illustrates a span that is terminated because the next query term in the document is more than a threshold distance from the last query term in the current sequence. In this example, the query terms are "a," "b," "c," and "d" and the document contains "a . . . b . . . c . . . d," where the ellipses represent a zero or more non-query terms. In this example, the current sequence is "a . . . b . . . c," and the distance between "a" and "b" and between "b" and "c" is less than the threshold distance. The distance, however, between "c" and "d" is greater than the threshold distance. As a result, the relevance system terminates the current sequence after "c," resulting in a span of "a . . . b . . . c," and starts a new sequence at "d." Case 2 illustrates a span that is terminated because the next query term in the document is a repeat of the last query term in the current sequence. The current sequence is "a . . . b . . . c," and the next query term "c" is the same as the last query term in the sequence. As a result, the relevance system terminates the current sequence after "c," resulting in a span of "a . . . b . . . c," and starts a new sequence at the second "c." Case 3 illustrates a span that is terminated because the next query term is a repeat of a query term in the sequence. In this case, the current sequence is "a . . . b . . . c" and next query term is "b." To ensure that a span includes only one occurrence of each query term, the relevance system could set the first span to "a . . . b" and the second span to start at "c" or the first span to "a . . . b . . . c" and the second span to start at the second "b." The relevance system selects where to end the current sequence based on the distance between the repeated query term and its next query term within the sequence and the distance between the last query term of the sequence and the next query term of the document. In particular, the relevance system terminates the span where the distance is longer. In this example, if the distance between the first occurrence of "b" and "c" is greater than the distance between "c" and the second occurrence of "b," then the relevance system shortens and terminates the sequence to after the first occurrence of "b" and starts the next sequence at "c." If, however, the distance between the first occurrence of "b" and "c" is not greater than the distance between "c" and the second occurrence of "b," then the relevance system terminates the sequence after "c" and starts the next sequence at the second occurrence of "b."

Figure 2:
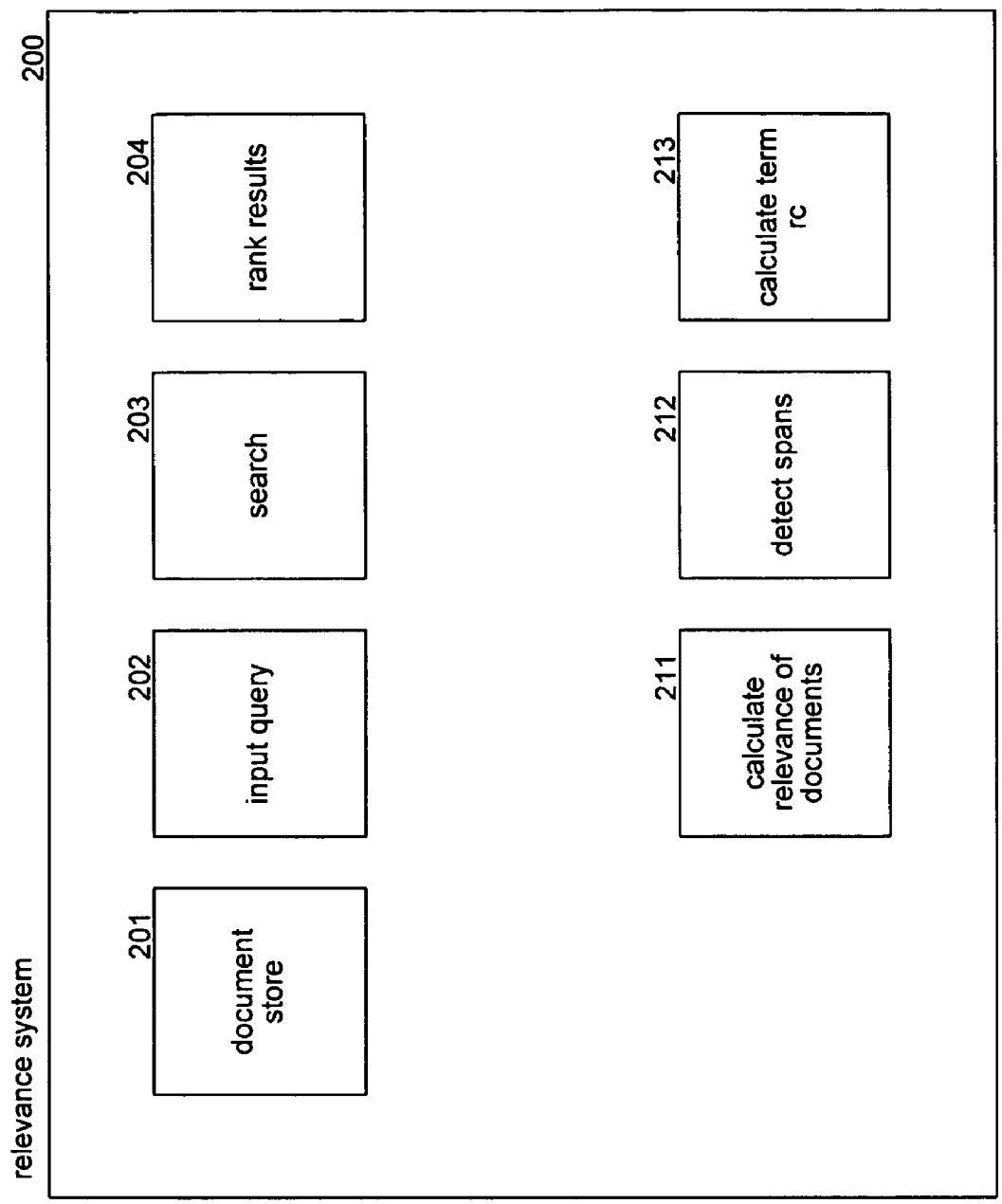
FIG. 2 is a block diagram that illustrates components of the relevance system in one embodiment.

FIG. 2 is a block diagram that illustrates components of the relevance system in one embodiment. The relevance system 200 includes a document store 201, an input query component 202, a search component 203, and a rank results component 204. The relevance system inputs a query using the input query component, searches the document store using the search component, and ranks the search results using the rank results component. The rank results component invokes a calculate relevance of documents component 211 to calculate the relevance of each document in the search results to the query. The ranking may be simply based on the relevance. The calculate relevance of documents component invokes a detect spans component 212 to detect the spans of query terms within a document. The calculate relevance of documents component also invokes a calculate term relevance contribution component 213 to calculate the relevance contribution of a query term to the relevance of a document. The relevance system may then rank the search result based on document relevance and display the search results in rank order to the user who input the query.

The computing device on which the relevance system is implemented may include a central processing unit, memory, input devices (e.g., keyboard and pointing devices), output devices (e.g., display devices), and storage devices (e.g., disk drives). The memory and storage devices are computer-readable media that may contain instructions that implement the relevance system. In addition, the data structures and message structures may be stored or transmitted via a data transmission medium, such as a signal on a communications link. Various communications links may be used, such as the Internet, a local area network, a wide area network, or a point-to-point dial-up connection.

The relevance system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The relevance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
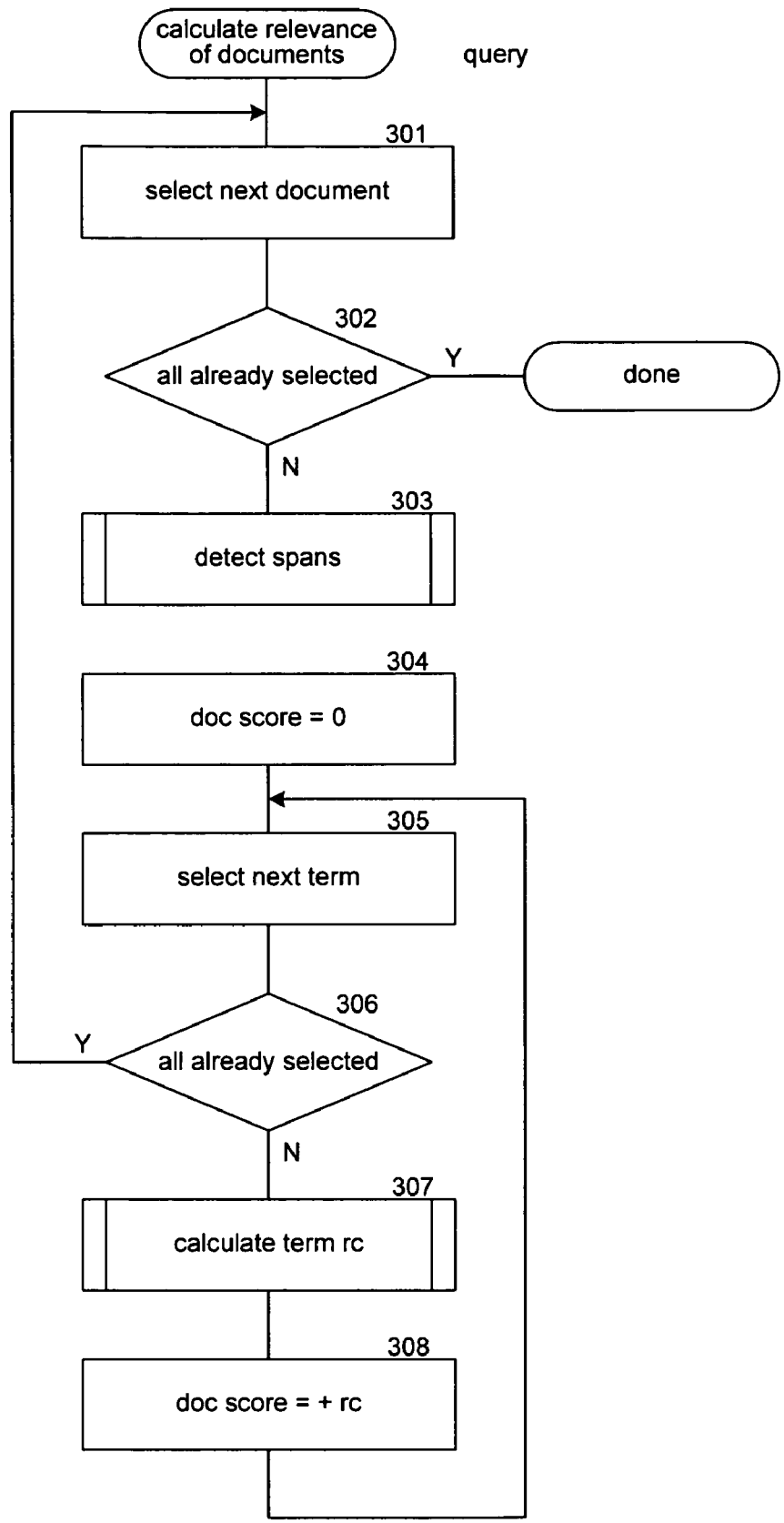
FIG. 3 is a flow diagram that illustrates the processing of the calculate relevance of documents component of the relevance system in one embodiment.

FIG. 3 is a flow diagram that illustrates the processing of the calculate relevance of documents component of the relevance system in one embodiment. The component is passed a query and generates a relevance score for each document of a corpus (e.g., document store) indicating the relevance of the document to the query. In block 301, the component selects the next document of the corpus. In decision block 302, if all the documents of the corpus have already been selected, then the component completes, else the component continues at block 303. In block 303, the component invokes the detect spans component to detect the spans of query terms within the selected document. In blocks 304-308, the component loops calculating a relevance contribution for each query term and aggregating the relevance contributions into a relevance score for the selected document. In block 304, the component initializes the document relevance score. In block 305, the component selects the next query term. In decision block 306, if all the query terms have already been selected, then the component loops to block 301 to select the next document, else the component continues at block 307. In block 307, the component invokes the calculate term relevance contribution component to calculate the relevance contribution of the selected query term for the selected document. In block 308, the component increases the document relevance score by the relevance contribution and then loops to block 305 to select the next query term.

Figure 4:
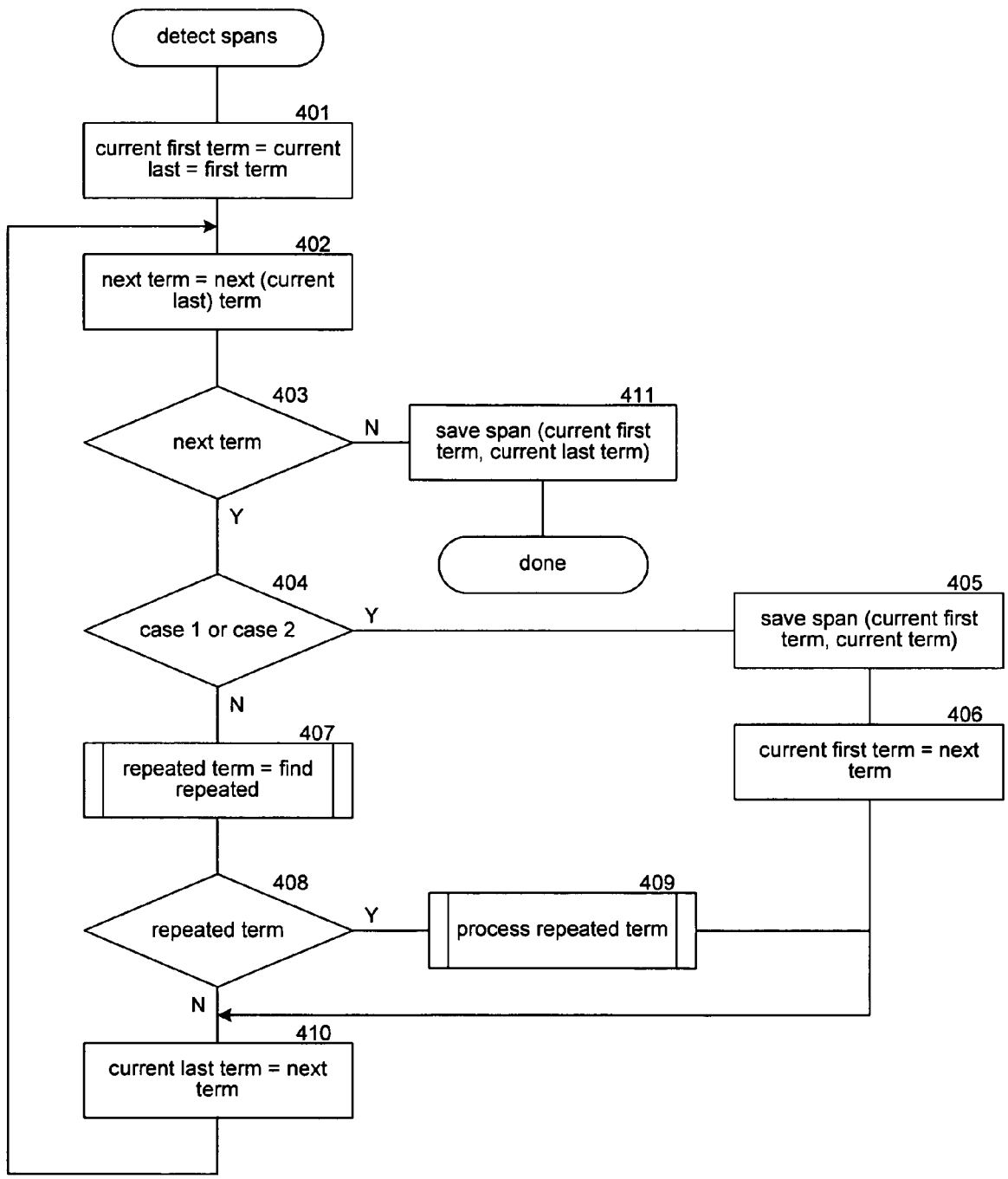
FIG. 4 is a flow diagram that illustrates the processing of the detect spans component of the relevance system in one embodiment.

FIG. 4 is a flow diagram that illustrates the processing of the detect spans component of the relevance system in one embodiment. The detect spans component is passed a document along with a query. The component identifies the query terms within the document and then processes the query terms sequentially to identify the spans. The component uses the variable current first term to identify the first query term in the current sequence of query terms and the variable current last term to identify the current last query term of the sequence. The component decides whether to continue or terminate the sequence based on the proximity of the next query term of the document and based on whether it is a repeat of a query term already in the sequence. If the next query term is farther than a threshold distance from the current last term, the component terminates the sequence at the current last term and starts a new sequence at the next query term. If the next query term is the same as the current last term, the component also terminates the sequence at the current last term and starts a new sequence at the next query term. If, however, the next query term is a repeat of a query term within the current sequence other than the current last term, the component may shorten the sequence based on the distance of the repeated query terms to other query terms within the sequence and then terminates the sequence. In block 401, the component initializes the variable current first term and the variable current last term to the first query term of the document. In blocks 402-410, the component loops selecting and processing each subsequent query term of the document. In block 402, the component initializes the variable next term to the next query term after the current last term. In decision block 403, if there is a next term to select, then the component continues at block 404, else the component continues at block 411 to complete the processing of the document. In decision block 404, if a first termination criterion is satisfied (e.g., case 1 or case 2 as described above), then the component continues at block 405, else the component continues at block 407. The first termination criterion is satisfied when the distance between the current last term and the next term is greater than a threshold distance or when the current last term is the same as the next term. In block 405, the component saves the sequence from the current first term to the current last term as a span. In block 406, the component sets the current first term equal to the next term to start a new sequence and continues at block 410. In block 407, the component invokes the find repeated term component to determine whether the next term occurs within the current sequence. In decision block 408, if the next term is a repeated term, then the component continues at block 409, else the component continues at block 410. In block 409, the component invokes the process repeated term component to terminate the current sequence, possibly shortening it. In block 410, the component sets the current last term to the next term to extend the current sequence and then loops to block 410 to select the next query term. In block 411, the component saves the current sequence as a span and then completes.

Figure 5:
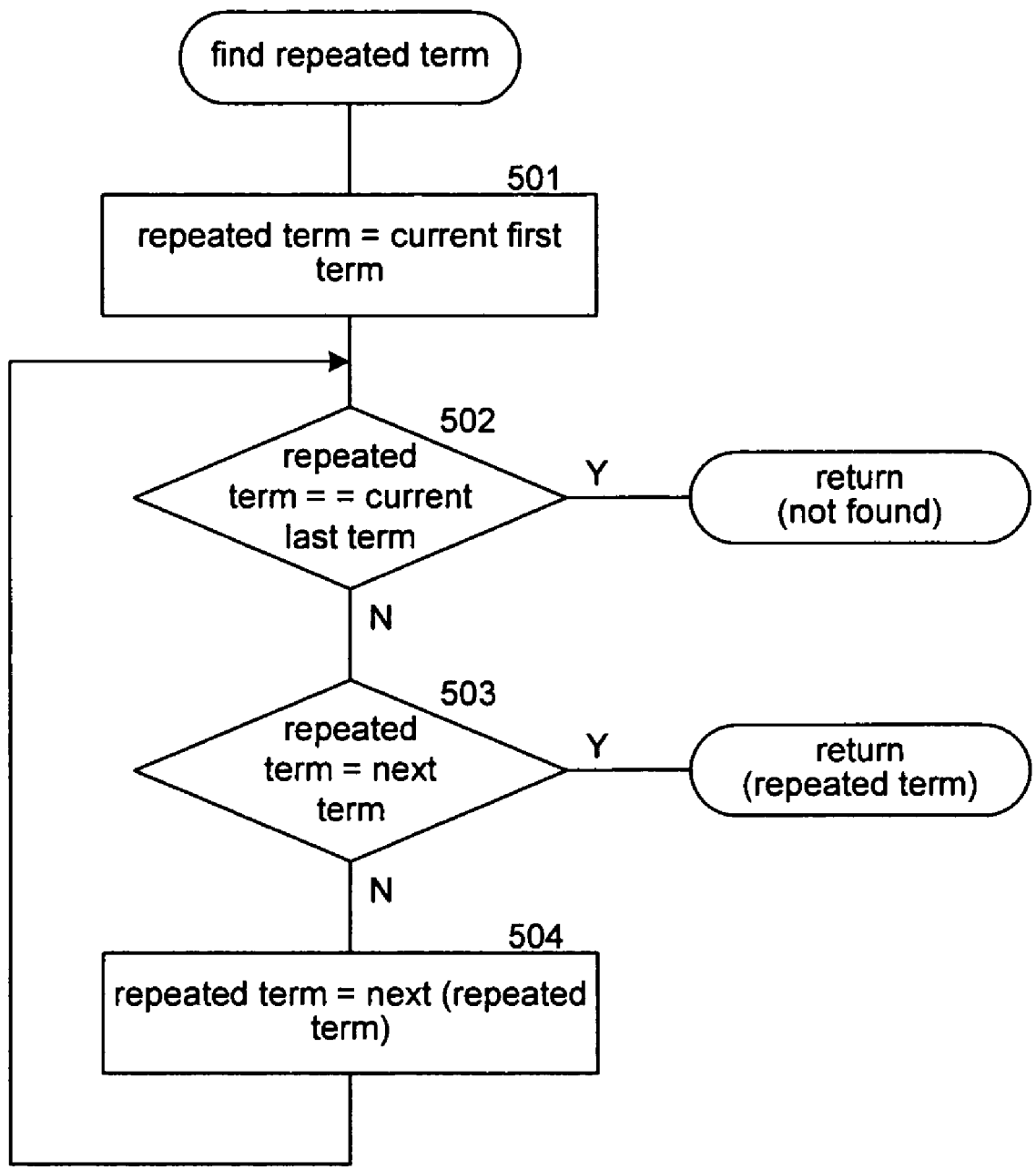
FIG. 5 is a flow diagram that illustrates the processing of the find repeated term component of the relevance system in one embodiment.

FIG. 5 is a flow diagram that illustrates the processing of the find repeated term component of the relevance system in one embodiment. The component determines whether the next term occurs within the current sequence. In block 501, the component sets the variable repeated term to the current first term, which is the beginning of the current sequence. In blocks 502-504, the component loops checking each query term of the sequence to determine if it is a repeat of the next term. In decision block 502, if the repeated term is equal to the current last term, then the component is at the end of the current sequence and returns an indication that no repeated term was found, else the component continues at block 503. In decision block 503, if the repeated term equals the next term, then the component returns the repeated term, else the component continues at block 504. In block 504, the component sets the repeated term to the next query term after the repeated term and then loops to block 502.

Figure 6:
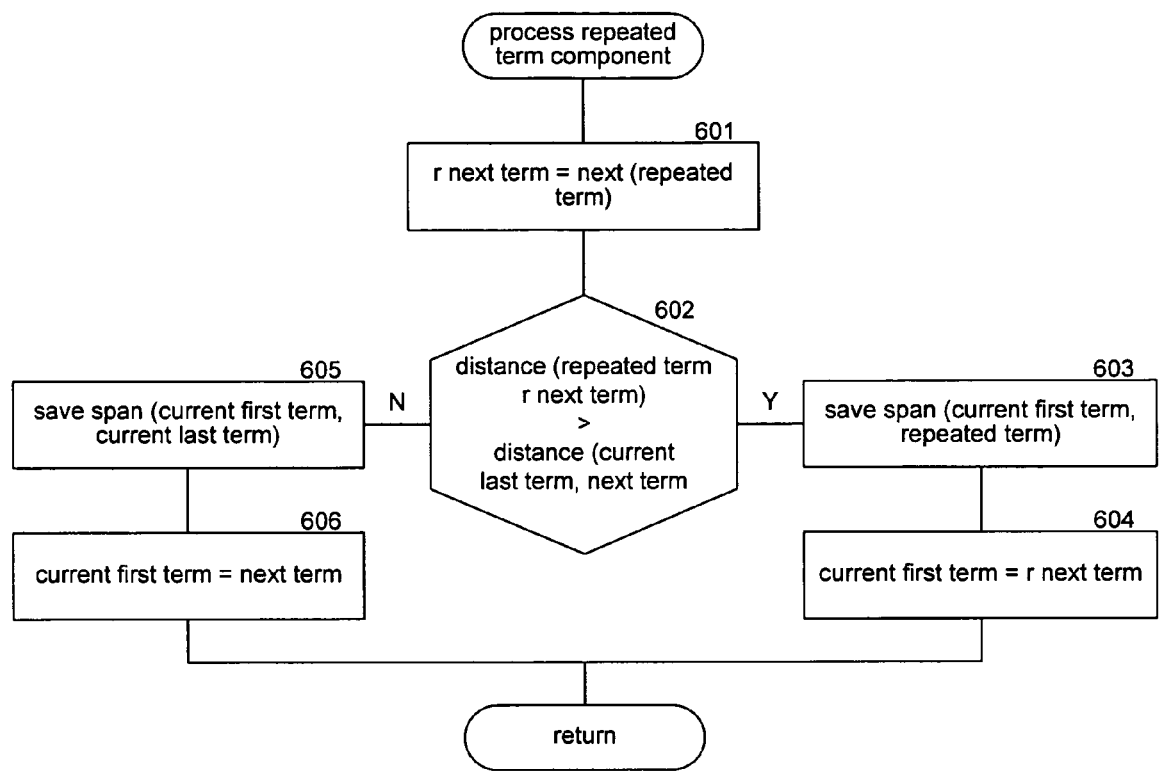
FIG. 6 is a flow diagram that illustrates the processing of the process repeated term component of the relevance system in one embodiment.

FIG. 6 is a flow diagram that illustrates the processing of the process repeated term component of the relevance system in one embodiment. The component shortens the current sequence when the distance between the occurrence of the repeated term within the current sequence and the next query term within the sequence is greater than the distance between the current last term and the next term. Otherwise, the component terminates the current query after the current last term. In block 601, the component sets the repeated next term to the next query term after the repeated term. In decision block 602, if the distance between the repeated term and the repeated next term is greater than the distance between the current last term and the next term, then the component continues at block 603, else the component continues at block 605. In block 603, the component saves as a span the sequence from the current first term to the repeated term, which is a shortening of the sequence. In block 604, the component sets the current first term to the repeated next term to start the new sequence and then returns. In block 605, the component saves as a span the current sequence from the current first term to the current last term. In block 606, the component sets the current first term to the next term to start the next sequence and then returns.

Figure 7:
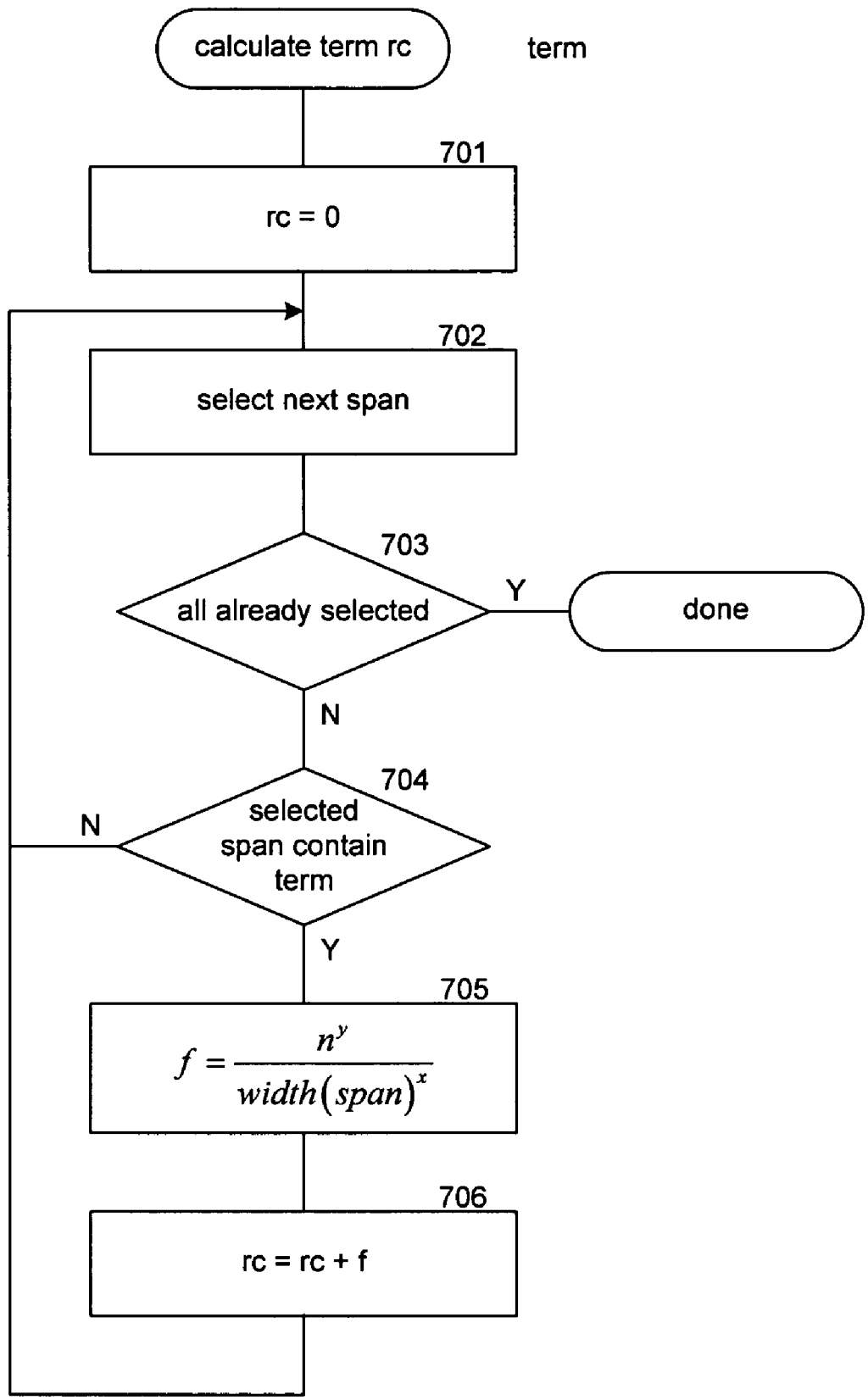
FIG. 7 is a flow diagram that illustrates the processing of the calculate term relevance contribution component of the relevance system in one embodiment.

FIG. 7 is a flow diagram that illustrates the processing of the calculate term relevance contribution component of the relevance system in one embodiment. The component is passed a query term and calculates the relevance contribution of that query term based on the spans of a document. In block 701, the component initializes the relevance contribution to zero. In blocks 702-706, the component loops selecting each span and adjusting the relevance contribution based on the relevance of the query term derived from the span. In block 702, the component selects the next span of the document. In decision block 703, if all the spans have already been selected, then the component returns with the accumulated relevance contribution, else the component continues at block 704. In decision block 704, if the selected span contains the passed query term, then the component continues at block 705, else the selected span does not contribute to the relevance contribution of the query term and the component loops to block 702 to select the next span. In block 705, the component calculates the query term relevance derived from the selected span. In block 706, the component increases the relevance contribution by the query term relevance and then loops to block 702 to select the next span of the document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system with a processor and memory for determining relevance of a query to a document, the query having query terms, the method comprising:
    receiving from a user the query;
    for each of a plurality of documents,
        identifying spans of query terms within the document with no repeated occurrences of a query term, each span including multiple query terms and having a span width, wherein at least one span includes at least three query terms, wherein a distance between adjacent query terms within a span is less than a threshold distance, and wherein the distance between two query terms is based on the number of non-query terms between the two query terms;
        for each identified span, calculating a span relevance based on the number of query terms in the span and the inverse of the width of the span;
        for each query term, aggregating the calculated span relevances for each span that contains the query term into a query term relevance of the query term to the document, wherein the aggregating includes summing the calculated span relevance for each span that contains the query term; and
        aggregating the query term relevances for the query terms into a document relevance indicating relevance of the document to the query; and
    displaying an indication of the documents in an order based on the relevance of the documents to the received query.

2. The method of claim 1 wherein the span relevance for a span is calculated based on the following:

$$f(t, espan_i) = \frac{n_i^y}{\text{Width}(espan_i)^x}$$

where t is a query term, $espan_i$ is a span that contains t, $n_i$ is the number of query terms that occur in $espan_i$, Width($espan_i$) is the span width of $espan_i$, x is an exponent that is used to control the influence of the span width, and y is an exponent that is used to control the influence of the number of query terms in the span.

3. The method of claim 1 including replacing a term frequency with the query term relevance in an equation for calculating relevance of a document to a query.

4. The method of claim 3 wherein the equation before replacing is based on term frequency and inverse document frequency.

5. The method of claim 3 wherein term frequency is not used to calculate relevance.

6. The method of claim 1 wherein the document is a web page.

7. A method in a computer system with a processor and memory for calculating relevance of a document to a query of query terms, the method comprising:
    receiving from a user the query;
    for each of a plurality of documents,
        identifying spans of query terms within the document, wherein a span includes no repeated occurrences of a query term, wherein at least one span has at least three query terms, wherein each span includes multiple query terms and has a span width, wherein a distance between adjacent query terms within a span is less than a threshold distance, and wherein the distance between two query terms is based on the number of non-query terms between the two query terms;
        calculating a relevance contribution of each query term based on the identified spans that contain that query term, the relevance contributing being based on the number of query terms in the identified span and the inverse of the width of the identified span; and
        determining relevance of the document to the query based on the calculated relevance contributions without using term frequency by replacing a term frequency with the query term relevance in an equation for calculating relevance of a document to a query; and
    displaying an indication of the documents in an order based on the relevance of the documents to the received query.

8. The method of claim 7 wherein the calculating of the relevance contribution of a query term includes calculating relevance of the query term resulting from a span based on the following:

$$f(t, espan_i) = \frac{n_i^y}{\text{Width}(espan_i)^x}$$

where t is a query term, $espan_i$ is a span that contains t, $n_i$ is the number of query terms that occur in $espan_i$, Width($espan_i$) is the span width of $espan_i$, x is an exponent that is used to control the influence of the span width, and y is an exponent that is used to control the influence of the number of query terms in the span.

9. The method of claim 7 wherein the determining of relevance is based on an equation that uses inverse document frequency.

10. The method of claim 9 wherein term frequency within the equation is replaced with the calculated relevance contribution.

11. A computer-readable storage medium containing instructions for controlling a computer system to identify spans of query terms of a query within a document for use in determining relevance of documents to the query, by a method comprising:
    receiving from a user a query of query terms;
    for each of a plurality of documents,
        identifying query terms within the document;
        identifying sequences of query terms wherein a sequence includes no repeated occurrences of a query term, wherein at least one sequence includes at least three query terms, wherein a distance between adjacent query terms within a sequence is less than a threshold distance, and wherein the distance between two query terms is based on the number of non-query terms between the two query terms wherein a sequence is a span of query terms; and for each of the identified query terms of the document,
for each span that contains the query term, increasing relevance of the document to the received query by a span relevance of the query term that is based on the number of query terms within the span and an inverse of the span width, wherein the relevance of the document is based on replacing a term frequency with a query term relevance derived from the span relevance in an equation for calculating relevance of a document to a query; and
displaying an indication of documents in an order based on the relevance of the documents to the received query.

12. The computer-readable storage medium of claim 11 wherein when a sequence of query terms is adjacent to two occurrences of the same query term, including within the sequence the query term that is closest to a query term of the sequence.

13. The computer-readable storage medium of claim 11 including calculating a relevance of query terms based on the following:

$$f(t, espan_i) = \frac{n_i^y}{\text{Width}(espan_i)^x}$$

where t is a query term, $espan_i$ is a span that contains t, $n_i$ is the number of query terms that occur in $espan_i$, Width($espan_i$) is the span width of $espan_i$, x is an exponent that is used to control the influence of the span width, and y is an exponent that is used to control the influence of the number of query terms in the span.

* * * * *